… … …

United States Patent Office 2,985,675
Patented May 23, 1961

2,985,675

MANUFACTURE OF ORGANOLEAD COMPOUNDS

Sidney M. Blitzer and Tillmon H. Pearson, Baton Rouge, La., assignors to Ethyl Corporation, New York, N.Y., a corporation of Delaware No Drawing. Filed Jan. 7, 1957, Ser. No. 632,650

7 Claims. (Cl. 260—437)

This invention is concerned with a process for the preparation of organolead compounds. In particular it is directed to an improved process for the manufacture of tetraethyllead.

The present commercial process for the manufacture of tetraethyllead has been in use for a number of years and in general is satisfactory. However, it has certain disadvantages which are overcome by practicing this invention. In particular, when reacting sodium lead alloy with ethyl chloride, only about 22 percent of the lead is converted to tetraethyllead. Thus, at least 75 percent of the lead originally employed is not alkylated. This lead must be recovered and reprocessed to sodium-lead alloy in order to provide an economical process. Likewise, a further disadvantage is that valuable reaction space in the reaction vessel is occupied by such unreacted lead.

Numerous improvements in the above process have been devised to consume the lead produced. Although satisfactory from the lead consumption standpoint, they do however suffer an additional drawback in common with the commercial process in that they require an organic halide as the ethylating agent. One such process is that disclosed in U.S. Patent 2,535,190 wherein lead, as produced in the present commercial process, is treated with metallic magnesium and ethyl chloride in the presence of a catalyst, particularly the alkyl ethers. Thus, in this process as well as the present commercial process the tetraethyllead manufacturing operation is restricted by the balance between the metallic sodium required and the organo chlorine of the ethyl chloride.

The literature also describes the preparation of tetraethyllead by the reaction of lead chloride with diethyl zinc, Grignard reagents, or organolithium compounds. These processes have not been employed commercially primarily because of the low yields obtained, economy factors, and the destruction of the organolead compound by the by-product metal halide produced.

More recently, organolead compounds have been prepared by an improved process involving the reaction of lead bromides, iodides, or chlorides with other distinct and diverse organometallic compounds such as triethylaluminum. However, this new development still suffers certain disadvantages of the prior procedures although higher yields and a more economic process has been provided. Thus, it is evident that new processes for the manufacture of these valuable products is highly desirable.

It is therefore an object of this invention to provide a novel process for the manufacture of organolead compounds which overcomes the disadvantages of the present commercial process and those processes which have been proposed more recently as an improvement thereover. A particular object is to increase the conversion of lead to tetraethyllead above that obtained in the present commercial process without requiring the use of metallic sodium, metallic lead, or alkyl halogen compounds.

The above and other objects of this invention are accomplished by reacting a lead fluoride with a stable non-lead organometallic compound. Contrary to what would be expected, it has now been found that the lead fluorides can be employed for reaction with non-lead organometallic compounds to produce organolead compounds directly and in higher yield than when conducting such a reaction employing the other lead halides. The organometallic compound preferably comprises metals and metalloids of the groups IA, IIA, and IIIA of the periodic chart of the elements ("Handbook of Chemistry and Physics," 35th Edition, Chemical Rubber Publishing Company, Cleveland, Ohio, page 392), having an atomic weight greater than 23, particularly the organoaluminum compounds.

In accordance with this invention, it is unnecessary to start with a lead alloy, or to employ metallic lead at all, to produce organolead compounds. The only lead compound required is a lead fluoride, e.g., lead difluoride or lead tetrafluoride.

In the organometallic compound, it is preferred that the metal or metalloid in question be attached only to carbon atoms in order to effect efficient utilization of this reactant. However, it is to be understood that the metal, in addition to having at least one metal to carbon bond can also be bonded to a halogen, e.g., chlorine, bromine, iodine and fluorine or another metal, for example the alkali or alkaline earth metals, in the case of polyvalent metals. The organo portion can be any organic radical including those having substituents in the radical such as a halogen provided such are essentially inert. In a preferred embodiment the organic radicals are hydrocarbon radicals, either acyclic or cyclic aliphatic radicals or aromatic radicals. Of the aliphatic radicals, it is preferred to employ the lower alkyl radicals having up to about 10 carbon atoms. Among the aromatic radicals which can be employed are included phenyl and hydrocarbon substituted phenyl radicals such as alkaryl radicals, and fused-ring aromatic radicals such as napthyl and hydrocarbon substituted fused-ring radicals. Of the aromatic radicals, it is preferred to employ aromatic radicals having up to about 10 carbon atoms. Thus, the organometallic compounds can be considered as organometallic alkylating or arylating agents with respect to the lead in the lead fluoride.

From a commercial standpoint the manufacture of tetraethyllead by this process is of the greatest importance. This embodiment can be illustrated by reference to the following equation which represents a particularly preferred embodiment.

$$4AlEt_3 + 6PbF_2 \rightarrow 3PbEt_4 + 3Pb + 4AlF_3$$

Illustrative of the alkylating or arylating agents which can be employed are methyl sodium, methyl lithium, dimethyl magnesium, methyl magnesium chloride, dimethyl zinc, dimethyl cadmium, trimethyl aluminum, tri-chloroethyl aluminum, sodium zinc, tetramethyl, magnesium aluminum pentamethyl, ethyl sodium, ethyl potassium, diethyl magnesium, ethyl magnesium iodide, diethyl zinc, triethyl aluminum, methyl diethyl aluminum, sodium boro tetraethyl, lithium aluminum tetraethyl, propyl sodium, diproyl magnesium, propyl magnesium bromide, diisopropyl zinc, dipropyl cadmium, tripropyl aluminum, sodium gallium tetrapropyl, octyl sodium, octyl lithium, dioctyl magnesium, dioctyl zinc, dioctyl cadmium, sodium aluminum tetraoctyl, phenyl sodium, phenyl potassium, tricyclohexyl aluminum, sodium cyclopentadiene, sodium acetylide, phenyl lithium, diphenyl magnesium, diphenyl zinc, triphenyl aluminum, lithium aluminum tetraphenyl, tolyl sodium, tolyl lithium, ditolyl zinc, tritolyl aluminum, lithium aluminum tetratolyl, naphthyl sodium, naphthyl potassium, naphthyl lithium, dinaphthyl magnesium, sodium aluminum tetranaphthyl, and the like.

In addition to the normal alkyl derivatives indicated heretofore, branched chain isomers can be employed. Likewise a mixture of two or more non-lead organometallic compounds can be employed, and if employed along with a redistribution catalyst there is produced a mixture of organolead compounds containing a multiplicity of organo radicals. Likewise, when the organo radicals are dissimilar, mixed organolead compounds result.

According to this invention as much as 50 percent of the lead is directly converted to organolead, or, in a commercial embodiment to tetraethyllead. In the case of lead difluoride this amounts to a quantitative conversion of the lead. The remaining portion of the lead is in a highly active form and ideally suited for employment in the commercial process employing sodium-lead alloy. Additionally the lead so produced can be recycled to the instant process by conversion to lead fluoride. When employing lead tetrafluoride essentially all the lead is converted to organolead product. An additional advantage of the present process is that higher yields of the organolead compounds are obtained than obtained when employing lead chloride, bromide, or iodide. Likewise the by-product metal fluoride obtained is less destructive of tetraethyllead than are the corresponding metal chlorides, bromides or iodides.

Our invention is adaptable to the production of organolead compounds generally, such as tetraethyllead, tetramethyllead, dimethyldiethyllead, tetraphenyllead, triethylphenyllead and tetrapropyllead. Nevertheless, for convenience in the following description, specific reference may be made to tetraethyllead, the most widely known because of its use as an antiknock agent. Whenever this material is referred to, it is to be understood that other organolead compounds or mixtures can be made by our process. While this invention is adapted to employ broadly the stable non-lead organometallic compounds defined heretofore, for convenience specific reference may be made hereinafter to employ aluminum triethyl as the preferred embodiment in manufacturing the important antiknock material, tetraethyllead.

The process is generally, but not necessarily, conducted in the presence of an inert carrier liquid. Hydrocarbons of appropriate boiling point with respect to the organolead compound produced are satisfactory and can be chosen so as to provide a solution of the product suitable for other applications or so that it can be readily removed by distillation at a temperature at which the organolead compound will not decompose. Other inert carrier liquids are satisfactory and where the product is a liquid such as, for example, in the manufacture of tetraethyllead, the organolead compound itself can be employed. In such an operation, economy is effected by obviating the necessity of recovery by other means than merely filtration of the co-produced solids. Other classes of carrier liquids comprise the organic halides. The principal criterion of choice, therefore, of such a liquid carrier is the physical characteristic of the organolead compound produced, and the essential inertness of the liquid to the reactants. In addition it has been discovered that certain reactant carriers, while inert to the reactants, exhibit a beneficial effect which may be considered catalytic in nature and contribute to the ease of reaction and rapidity of arriving at its completion at relatively lower temperatures and pressures. These reaction-promoting solvents or diluents comprise ethers and amines. Of these, the amines are most desirable since, for some unexplained reason, higher yields are obtained in these particular media. Of the amines, the secondary and heterocyclic tertiary amines comprise a particularly preferred class. Typical examples of secondary amines are dimethyl amine, diethyl amine, dioctyl amine, diphenyl amine, dicyclohexyl amine, methylethyl amine, and the like. The heterocyclic tertiary amines have been found to exhibit the most beneficial reaction promoting effect. Examples of such are pyridine, p-methyl pyridine, o-ethyl pyridine, o-p-dioctyl pyridine, isoquinoline, and the like.

The organometallic compounds employed as the reactants of this invention can be prepared by methods well known in the art. For example, the alkali metal compounds can be prepared by reaction of the alkali metal with an organomercury compound. The organoalkaline earth reactants can be produced by reacting the metal with an organic halide. Thus, diethyl magnesium is prepared by reacting ethyl chloride with magnesium turnings in the presence of diethyl ether, followed by addition of dioxane, thereby creating a separate liquid phase containing diethyl magnesium, halide-free, in a mixture of diethyl ether and dioxane. Group IIIA organo compounds can be produced by reaction of the group IIIA halide with an alkali metal organometallic compound. Thus aluminum triethyl is produced by reaction of lithium ethyl and aluminum trichloride. The group IIB reactants can be prepared by direct reaction of the metal and an organic halide. Thus, zinc diethyl is produced by reacting a zinc-copper couple with ethyl chloride and distilling diethyl zinc from the reaction mixture. The mixed metal organics are typified by lithium aluminum tetraethyl which can be prepared by reaction of lithium hydride and aluminum chloride to first form lithium aluminum hydride, which is then alkylated with ethylene. It is not intended, however, that the scope of this invention be limited to any particular method of producing the hydrocarbon carrying reactant.

The invention can be more fully understood from a consideration of the following example.

*Example I*

An autoclave equipped with internal agitation, external heating means and external cooling means was employed having a hopper attached thereto for containing finely divided lead fluoride. The hopper has a plug cock at the discharge end for transmission of the lead fluoride to the autoclave. To the autoclave was added 49 parts of pyridine. Agitation was commenced and 12.2 parts of lead fluoride of particle size less than $\frac{1}{32}$ inch were introduced. The stopcock of the hopper was then closed. The autoclave was purged with dry nitrogen gas then 4.2 parts of aluminum triethyl were fed thereto. The reaction mixture, while under a nitrogen atmosphere, was then heated to the reflux temperature and refluxed for 1 hour. The mixture was then cooled to room temperature and filtered to remove solid constituents which are further purified for recovery of lead value. The filtrate was washed with an even volume of water. The organic lead product was transferred to a still for removal, by vacuum distillation, of the pyridine and recovery of the tetraethyllead from the mixture. The yield of tetraethyllead obtained was 99.8 percent.

Similarly when trimethyl aluminum, tripropyl aluminum, tricyclohexyl aluminum, triphenyl aluminum, tribenzyl aluminum, trioctyl aluminum and similar compounds in which boron, gallium or indium are substituted for aluminum, are employed in the above example satisfactory yields of the corresponding organolead products are obtained.

In general the reaction of this process is completed in a relatively short period at elevated temperature but a somewhat longer time is required at lower temperatures. In all instances however, higher yields per unit time are obtained when employing the lead fluoride than when employing the lead chloride, bromides, or iodides. In general a reaction time of between about ½ to 20 hours is employed. Ordinarily however, the reaction will be completed within a period of about 4 hours. In the manufacture of tetraethyllead employing especially aluminum triethyl and lead fluoride, it is preferred to employ a reaction time of between about ½ hour to 3 hours in order to minimize side effects, e.g., thermal decomposition of the organolead product, The pressure employed in the reaction vessel is not critical. Usually the autogenous pressure created by the reaction, or the carrier liquid if employed, is used. Since the organolead compounds are relatively toxic it is desirable to employ a closed vessel in conducting the reaction and such may create elevated pressure when using low boiling reactants, diluents or reaction promoters.

The temperature required to initiate the self-sustaining reaction of this invention varies with the organolead compounds being produced. In most instances reaction will commence at room temperature or lower. In general, with the lower molecular weight lead compounds such as tetraethyllead, it is preferred to employ temperatures in the range of 25 to 150° C. With higher molecular weight compounds, for example tetraphenyllead, it is preferred to operate in the range of 50 to 100° C. So far as now known, the reaction can be conducted satisfactorily at temperatures up to about the decomposition temperature of the organometallic reactant or the organolead product produced. Thermal stabilizers can be employed, however, to permit the operation of the reaction at still higher temperatures without the concomitant decomposition of the reactants or the organolead product. For example naphthalene, styrene and other well known stabilizers for organolead compounds, can be employed in the reaction.

As the lead fluoride, and in some instances the organometallic compound, is a solid and generally a solvent therefore is not employed, it is preferred in order to provide a relatively rapid and controllable reaction to employ these reactants in finely divided form or at least in the form of small granules.

While in general a catalyst is not required for conducting this invention, certain materials do exhibit a catalytic effect on the reaction and in many instances their inclusion provides a smoother operation. Typical of such catalysts are heavy metal iodides, as well as iodine itself, organo halides, particularly the iodides, certain ketones such as acetone and methylethyl ketone, organometallic compounds, ethers and amines. As indicated previously, the amines are particularly suitable.

The proportions of the reactants are not critical and can be varied over a wide range. For example, the lead fluoride can be employed in excess or, conversely, the organometallic compound can be in excess. It has been found however that the employment of the organometallic compound in excess is more desirable and effects a more complete conversion of the lead to the organolead product. In general, the proportions are such that the organometallic compound is employed in amount between about the stoichiometric amount and 10 percent in excess.

The following examples serve to illustrate additional specific embodiments of the invention, however, it is not intended to be limited thereto.

Example II

Employing the procedure of Example I, when 12.2 parts of lead fluoride were reacted with 4.2 parts of triethyl aluminum under reflux conditions for 1 hour in the presence of 43 parts of dimethoxyethane, a high yield of tetraethyllead was obtained.

In place of pyridine and dimethoxyethane employed in Examples I and II as reaction promoters, good results are obtained when other such promoters mentioned heretofore are employed. For example, the amines such as diethyl amine, triethyl amine, quinoline, and the like can be employed. Beneficial reaction promotion is obtained when ethers such as the dimethyl or diethyl ether of diethylene glycol, dioxane, tetrahydrofuran, and the like are employed.

It is to be understood that mixtures of such solvents can be employed. Particularly suitable mixtures are those of the hydrocarbons and amines. Other suitable mixtures are those of hydrocarbons and ethers, ethers and amines, hydrocarbons and organic halides, and the like. The relative proportions of each diluent can be varied over a wide range, for example, from 1 to 100 parts by weight of each. It is preferred, however, that from 1 to 50 parts of each be employed. In mixtures of hydrocarbons and amines the most effective ratio is between 15 to 1 part by weight of the hydrocarbon per part by weight of the amine. The following example will demonstrate a particularly effective mixture of solvents which can be employed.

Example III

Employing the procedure of Example I when reacting 12.2 parts of lead fluoride with 4.2 parts of aluminum triethyl suspended in a mixture of 30 parts of toluene and 10 parts of diethyl amine at the reflux temperature for 1 hour, the yield of tetraethyllead obtained was 92.2 percent.

Example IV

When ethyl sodium is reacted with lead tetrafluoride suspended in a residual amount of tetraethyllead essentially as described in Example I, tetraethyllead is produced in high yield.

In place of ethyl sodium, phenyl sodium, benzyl sodium, ethyl lithium, amyl potassium and the like organometallic compounds which can be further substituted with essentially inert substituents can be employed to produce similar results.

Example V

When 17 parts of sodium aluminum tetraethyl are reacted with 5 parts of lead fluoride in the presence of 50 parts of toluene as the inert diluent under the reflux temperature for 2 hours, tetraethyllead is obtained in high yield.

Similar results are obtained when other hydrocarbons such as cyclohexane, n-nonane, toluene, xylene and the like are employed as well as organic halides such as ethyl chloride, ethylene dichloride and the like.

Example VI

The procedure of Example I is repeated essentially as described but in this instance 12 parts of ethyl aluminum sesquichloride are reacted with 15 parts of lead fluoride in xylene at the reflux temperature for 4 hours. An essentially quantitative conversion of the lead to tetraethyllead is obtained.

In place of ethyl aluminum sesquichloride in the above example, similar results are obtained when ethyl aluminum dichloride, dimethyl aluminum chloride, ethyl magnesium bromide, ethyl calcium iodide, ethyl zinc chloride, amyl cadmium bromide, and diphenyl aluminum chloride are substituted.

Example VII

When 12 parts of diphenyl magnesium (prepared by reacting phenyl chloride with magnesium turnings in the presence of diethyl ether, followed by the addition of dioxane thereby creating a separate liquid phase containing diphenyl magnesium, halide free, in a mixture of diethyl ether and dioxane which was separated), is reacted with 12 parts of lead fluoride at the reflux temperature for 4 hours, tetraphenyl lead is obtained in high yield.

Example VIII

An essentially quantitative conversion of lead fluoride to tetraoctyllead is obtained when 10 parts of lead fluoride are reacted with 15 parts of dioctyl zinc in triethyl amine at the reflux temperature for 2 hours.

As mentioned previously, the process of this invention provides the organolead compounds in higher yields and in shorter periods of time than prior methods employed when reacting lead halides other than lead fluoride with organometallic compounds or the organic metal halide compounds. For example, when a comparison was made of the reaction triethyl aluminum in dimethoxy ethane at reflux temperature for 1 hour with lead chloride and lead fluoride respectively, an enhanced yield of tetraethyllead amounting to about 30 percent by weight was obtained in the lead fluoride run. Additionally, when reacting aluminum triethyl employing similar mixtures of toluene and pyridine at the reflux temperature for 1 hour with lead fluoride and lead chloride respectively, nearly twice as much tetraethyllead was obtained in the lead fluoride run than in the lead chloride run. Similar significant differences in yields per unit reaction time are obtained when ethyl lithium, diethyl zinc, and ethyl magnesium chloride are employed in place of triethyl aluminum in such reactions.

A particularly advantageous and preferred method of utilizing the process of this invention as specifically directed to a method for manufacturing tetraethyllead comprises starting with free aluminum and hydrogenating to produce the corresponding aluminum hydride or preparing ethyl aluminum hydride by employing triethyl aluminum as a catalyst in the aluminum hydrogenation reaction. A second step then comprises reacting the aluminum hydride or ethyl aluminum hydride produced with ethylene to produce triethyl aluminum which is then reacted with the lead fluoride in accordance with the foregoing description of the present invention.

This application is a continuation-in-part of our co-pending applications, S.N. 497,378, now U.S. Patent 2,859,228; S.N. 497,379, now U.S. Patent 2,859,229; and S.N. 497,382, now U.S. Patent 2,859,230; all of which were filed on March 28, 1955.

Having thus described the present invention, it is not intended that it be limited except as set forth in the following claims.

We claim:
1. A process of producing a hydrocarbon lead compound which comprises reacting a lead fluoride with a hydrocarbon metallic compound of a metal selected from the group consisting of group IA, IIA, and IIIA metals wherein the hydrocarbon portion of said compound is composed of radicals having up to 10 carbon atoms inclusive and selected from the group consisting of alkyl and aryl radicals.

2. The process of claim 1 wherein the hydrocarbon radicals are alkyl.

3. The process of claim 1 wherein the reaction is conducted in the presence of an amine selected from the group consisting of secondary and heterocyclic tertiary amines.

4. A process for the manufacture of tetraethyllead which comprises reacting lead fluoride with triethyl aluminum at a temperature between about 25 to 150° C. in the presence of an amine selected from the group consisting of secondary and heterocyclic tertiary amines as a reaction promoting diluent.

5. The process of claim 4 wherein said reaction promoting diluent is pyridine.

6. The process of claim 1 wherein the hydrocarbon metallic compound is an alkyl group IIIA metal compound and the reaction is conducted at a temperature between about 25 to 150° C. in the presence of a heterocyclic tertiary amine.

7. The process of claim 5 further characterized in that said triethylaluminum is employed in amount between about the stoichiometric amount and 10 percent in excess.

References Cited in the file of this patent
UNITED STATES PATENTS

| | | |
|---|---|---|
| 2,786,860 | Ziegler et al. | Mar. 26, 1957 |
| 2,826,598 | Ziegler | Mar. 11, 1958 |

FOREIGN PATENTS

| | | |
|---|---|---|
| 1,120,344 | France | Apr. 16, 1956 |

OTHER REFERENCES

Leeper et al.: Chem. Revs. 54, 108 (1954), citing Austin, J.A.C.S. 54, 3726 (1932).